3,531,383
Patented Sept. 29, 1970

3,531,383
METHOD OF PRODUCING ELECTRIC CAPACITORS
Gunter Lochmann, Heidenheim, Hans Winter, Hamburg, and Reimar Schmitt, Heidenheim, Germany, assignors to Siemens Aktiengesellschaft, Munich, Germany, a corporation of Germany
No Drawing. Filed Aug. 5, 1966, Ser. No. 570,409
Int. Cl. C23f *17/00;* H01g *9/05*
U.S. Cl. 204—38         4 Claims

ABSTRACT OF THE DISCLOSURE

Electric capacitors are produced by coating an anode body of aluminum, tantalum or niobium with forming a suitable dielectric oxide layer on the body and then forming a counter-electrode on the oxide layer by thermic decomposition of a solution of manganous nitrate and manganous acetate, the amount of acetate being sufficient to produce a manganese dioxide layer deficient in oxygen.

This invention relates to a process for the production of electric capacitors, in particular capacitors of aluminum, tantalum, or niobium, in which the anode bodies, which may be pre-treated, are covered with a suitably formed oxide layer functioning as the dielectric element, and following which manganese dioxide layers are produced, as the counter-electrode, on the oxide layer by thermic decomposition of manganese nitrate, and upon these layers at least one further electrically conducting layer, as the case may be, is applied as a current supply lead.

Several methods for the production of such dry-capacitors, in particular of tantalum, have already become known. For example, the formed anode is impregnated with manganese nitrate or moistened therewith, and the manganese nitrate is thermally decomposed to manganese oxide. Then a layer, for example, of graphite is applied to the manganese dioxide layer for contacting purposes and at least one metal layer is applied thereto. However, capacitors produced according to the known processes often do not exhibit the desired values of the electrical characteristics. In particular, the residual current behavior and the absence of break-down stability sometimes result in uneconomically high production rejections.

It is the purpose of the invention to develop a method in which these disadvantages are avoided and in which the electrical values of the capacitors may be improved, as well as a method which enables the production of dry-capacitors for use at higher operating voltages. In order to solve this problem, the invention utilizes applied manganese dioxide having a relatively low conductivity.

This theory of the invention is in contrast to known or proposed methods in which manganese dioxide layers of especially high conductivity are utilized. For example, it is a known feature to increase the conductivity of the manganese dioxide by the addition of thallium oxide. In this case, it has been stated that the conductivity of a manganese dioxide consisting of 5% thallium oxide and of 95% manganese dioxide results in 10 times the conductivity of the natural manganese dioxide, and with a manganese dioxide consisting of 15% thallium oxide and 85% manganese dioxide results in even 100 times the conductivity of natural manganese dioxide. Furthermore, it is a known feature that in order to increase the conductivity, the manganese dioxide layer is formed by reduction of a solution of a manganese salt in which the manganese is present in a higher valence state than in the dioxide form, in particular, by reduction of $KMnO_4$. Because of this feature, a manganese dioxide may be formed in which the oxygen content thereof corresponds almost to the formula $MnO_2$, the conductivity of which consequently is especially high. It is also suggested elsewhere to produce the manganese dioxide layer on the formed anode by oxidation of a manganese salt with an oxidation agent, for example, potassium chlorate. In this case, a manganese dioxide which is especially rich in oxygen, likewise is obtained. In papers which relate to the production of so-called dry-capacitors with a manganese dioxide layer as a counter-electrode and an oxide layer applied to the anode as the dielectric element, it is pointed out again and again that after the production of the manganese dioxide layers, any influence of reduction agents upon the manganese dioxide layers must be prevented. It has also already been proposed to replace the manganese dioxide layer by a lead dioxide layer because the lead dioxide possesses a higher electrical conductivity than manganese dioxide.

Contrary to such opinions proclaimed by experts, the invention proceeds on the theory of adjusting the conductivity of the manganese dioxide layers utilized as counter-electrode in the dry-capacitors, intentionally lowering the same by special measures. In this regard, the invention proceeds from the concept, confirmed by thorough tests, that at 50 Hz. the loss factors of dry-capacitors are to only a small extent caused by the manganese dioxide acting as barrier-resistance and to a much greater extent by damage suffered by dielectric element during the pyrolysis of the manganese nitrate. Presumably the dielectric element (tantalum oxide) loses oxygen at temperatures above approximately 200° and during the pyrolysis of the manganese nitrate, this temperature is customarily considerably exceeded.

It has already been proposed to avoid damage to the dielectric element during the pyrolysis of the manganese nitrate and to lower the loss factors of the capacitors by the feature that the anode bodies, covered with the oxide layer, are tempered at temperatures which lie considerably above (for example 100° C. or more) the pyrolysis temperature to be subsequently applied, the tempering preferably being accomplished with exclusion of oxygen. The tempered anode bodies are subsequently reformed at an electric voltage which approaches the voltage applied during the pre-forming, and only then is the manganese dioxide layer applied by pyrolysis of manganese nitrate. During this process, the anode metal surface adjacent to the oxide layer during the tempering is saturated with oxygen, which diffuses out of the oxide layer, so that during the subsequent pyrolysis of the manganese nitrate practically no more oxygen travels from the dielectric element into the anode metal. The oxygen which has left during tempering is subsequently delivered again during re-forming.

These steps of tempering and re-forming of anodes (already pre-formed prior to the application of the manganese dioxide layer) are in the following termed "thermic stabilizing." By means of this, the loss factors of dry-capacitors for 35 v. operating voltage with thermically stabilized anodes may be lowered to a value of 0.1 to 0.2% (measured at 50 Hz.) which has not been previously obtained.

However, even smaller loss factors than that of such dry-capacitors produced of "thermically stabilized" anodes are achieved by the stabilized anode bodies contained therein if they are measured "wet," for example, with 36% sulphuric acid (specific conductivity approximately 0.7 S./cm. at 18° C.) instead of the manganese dioxide counter-electrodes. Comparisons of the loss factors measured wet with the loss factors measured on such dry-capacitors produced out of "thermically stabilized" anode bodies permit the computation that for the specific conductivity of the manganese dioxide produced at approximately 280° C., the high value of 2 to 3 S./cm. has to be specified, which gives rise to the assumption that this high specific electrical conductivity is responsible for the high rejections with respect to the break-down strength, in particular with respect to dry-capacitors for an operating voltage of 35 v. and above. Furthermore, one also concludes, from the high conductivity of the manganese dioxide, that in order to avoid too high a rejection rate, the so-called intermediate forming voltage must be limited to relatively low values, compared with the forming voltage for the application of the dielectric element or for the re-forming. It is a known fact that the intermediate forming is done after the application of one or several manganese dioxide layers to again impart sufficient blocking ability to the dielectric damaged during the pyrolysis of the manganese nitrate. The voltage which can be economically applied during re-forming (i.e. which results in little rejection) is not proportional to the forming voltage which was applied for the production of the oxide layer, but the proportional factor must be adjusted to decrease as the voltage increases.

Consequently, the question arose as to whether dry-capacitors with higher dielectric strength, and therefore a smaller rejection rate, may be produced if the conductivity of the manganese dioxide is reduced and a corresponding increase of the loss factors and apparent resistance is accepted.

First of all, the step of intentionally lowering the manganese dioxide conductivity, in accordance with the invention was opposed by the fact that the closest possibility for the solution of this problem, namely a temperature increase during the pyrolysis of the manganese nitrate, cannot be applied because an increase of this temperature again results in a change for the worse in the dielectric, in particular because of diffusion of oxygen into the adjacent metal. Furthermore, this results not only in an increase in the losses, but also in too much of a dependence of the capacity upon temperature.

Consequently, two other methods for the decrease of the manganese dioxide conductivity are presented according to the invention. Both methods avoid the application of especially high temperatures during the production or subsequent treatment of the manganese dioxide layer. The first method employs an addition, by mixing, of certain foreign oxides to the manganese dioxide, in which case such foreign oxides are to be so selected that a decrease of the conductivity is achieved since there also are foreign oxides, for example thallium oxide, which effect a contrary result. The second method utilizes a decrease of the oxygen content in the manganese dioxide by means of reduction-agents.

The addition of the foreign oxides, for example nickel oxide, cobalt oxide, zinc oxide and nickel oxide, or mixtures thereof, and in particular zinc oxide, to the manganese dioxide may, for example, be accomplished by the feature that to the manganese nitrate to be decomposed, existing in the form of a solution or a melt of the crystal water-containing salt, such combinations of the metals involved are added as are soluble in the manganese nitrate solution and which may be decomposed to the oxides, at the latest at the temperature customarily set for the pyrolysis of the manganese nitrate, normally between 280 and 300° C. Carbonates or, in particular, nitrates of the mentioned metals meet these requirements, with combinations thereof being especially suitable. Expediently, the portion of the foreign metal in the manganese dioxide is adjusted, dependent on the operation voltage of the capacitors, to approximately 0.3 to 1 mol percent, with reference to the manganese, the portion being increased as the operating voltage of the condensers becomes higher. For example, for tantalum dry-capacitors having an operating voltage of 15 v., a foreign oxide addition of 0.3 to 0.5 mol percent is sufficient while for an operating voltage of 35 v. a foreign oxide addition of 0.7 to 1.0 mol percent is expedient.

With respect to tantalum dry-capacitors of 35 v. operating voltage and a capacitance of 22 $\mu f.$, residual currents on the order of 0.2 to 0.6 $\mu a.$ result when 0.7 mol percent nickel is added. These currents were measured after the contacting, in this case with graphite, at 35 v. after 30 seconds in order to exclude the influence of possible treatment errors during the subsequent processing. The comparative test without an addition of foreign oxide showed strongly varying residual currents up to 5 $\mu a.$ In the condensers produced, according to the invention, with foreign oxide contents in the manganese dioxide, the residual current values, even for a larger number of produced condensers, remained in the remarkably small range between 0.2 and 0.6 $\mu a.$ In addition to this, it appeared during long duration tests that the rejections with respect to 35 v. condensers can be reduced by one-half when foreign oxides, such as, for example, mixtures of nickel oxide, cobalt oxide, nickel oxide and zinc oxide or in particular zinc oxide are built into the manganese dioxide.

The second method for the reduction of the manganese dioxide conductivity is, as already mentioned, the lowering of the oxygen content of manganese dioxide. This lowering is obtained, according to the invention, by the feature that a reduction agent is added to the manganese nitrate utilized. For example, there can be utilized for this purpose, manganese formiate, formic acid, uric acid, hydrazine nitrate, acetic acid, ammonium acetate or benzoic acid. An especially preferred reduction-agent is manganese acetate, it preferably being in the form of preparation $Mn(CH_3COO)_2 \cdot 4H_2O$ is available in the trade for analytical purposes.

The manganese acetate-4-hydrate preferably to be employed is readily soluble in dilute solutions of manganese nitrate. If, however, melts of maganese nitrate-4- or -6-hydrate are employed, the acetate then cannot be completely dissolved directly without decomposition. In this case it is possible to proceed as follows: To the manganese acetate-4-hydrate, some water is added (for example, half the weight) and the mixture is liquefied by heating in a steam bath, from which there is obtained a clear solution. This acetate solution is mixed with the nitrate melt. To enable the dissolving operation to be carried out as seldom as possible, it is expedient to keep a supply of such solution, which is especially rich in acetate and yet (although supersaturated) is adequately stable to crystallization. Such a supply solution may have the following composition: 1 mole $Mn(CH_3COO)_2 \cdot 4H_2O + 3$ mole $H_2O + 1.5$ mole $Mn(NO_3)_2 \cdot 4H_2O$.

This stock solution is surprisingly sensitive. Even at $-10°$ C., some seconds in direct sunlight are sufficient for a noticeable discolouring, while several minutes result in a deep brown solution. In diffused daylight at room temperature, the stock solution discolours more slowly, and in the dark, the stock solution as well as usable solutions containing less acetate can be kept without decomposition. Processing with irradiated solutions or solutions aged by, for example, 1 to 4 weeks of standing, result surprisingly in capacitors, the residual currents of which show a tendency toward smaller values within the varying ranges. It is therefore proposed to leave the solutions of manganese acetate and manganese nitrate, standing for a long period of time, for example for 1 to 4 weeks, preferably in daylight and at a somewhat increased temperature, and to impregnate the anodes with such aged solutions.

The effect of the reduction-agent is evident. According to the amount of the added reduction-agent, intermediate points between black, metal-like conducting manganese oxide (approximately corresponding to the formula $MnO_2$) and brown, poorly conducting manganese oxide (approximately corresponding to the formula $Mn_2O_3$) are formed out of manganese nitrate during transformation (pyrolysis). The effect can be clearly conceived as on "installation of a break-down brake" analogous to the installation of the so-called Elko-paper as separators in electrolyte-impregnated capacitors.

As already mentioned, dry-capacitors for high operating voltages exhibit more break-downs than dry-capacitors for lower operating voltages. Accordingly, capacitors also show different requirements for different operating voltages with regard to the "break-down brake" to be installed with respect to the manganese dioxide layer, or, expressed in a different manner, with respect to the conductivity, for example, with regard to the oxygen deficit of the manganese dioxide layer in comparison with the formula $MnO_2$. For example, it is sufficient for condensers for an operating voltage of 15 v. if the amount of the reduction-agent, in particular of the manganese acetate, is adjusted to approximately 2 to 3, in particular 2.5 mol percent, in relation to the entire manganese. For condensers for an operating voltage of 35 v., an amount of 3 to 10 mol percent manganese acetate is expedient, while for condensers for 70 v. operating voltage or more the amount should be adjusted to 10 to 20 mol percent. Since the increase of the break-down stability involves a light increase of the loss factor, according to the invention, because of the lowering of the conductivity of the manganese dioxide, a compromise must be made respectively between the desired break-down stability and the admissible loss factor, which determines the amount of the addition for the lowering of the conductivity.

In some cases it may be appropriate not to apply three or more manganese dioxide layers of lowered conductivity upon the anode bodies, one after another, but to deposit a manganese dioxide layer of normal conductivity after two ar three such layers. Dry-capacitors produced in such a manner show good values of the loss factors and apparent resistances without losing any break-down stability.

In order to stabilize the values of the apparent resistances and of the loss factors, it is expedient to temper the anodes, following the application of at least one manganese dioxide layer, in air, preferably at temperatures between 200 and 250° C. for a duration of 10 to 20 minutes. Presumably, during this process an approach to a phase-equilibrium occurs. Before the application of the subsequent manganese dioxide layers, the so-called intermediate forming is accomplished. In anodes tempered in such a manner, the values of the apparent resistance and loss factors remain constant even after 800 hours duration test at 125° C. and 23 v.

Actually the decreased conductivity can be adjusted in all manganese dioxide layers. However, if the *first* manganese dioxide layer to be applied (directly on the tantalum oxide dielectric) is produced out of pure manganese nitrate solution, that is to say, only one or several of the subsequent impregnations is produced with manganese nitrate solution containing a reduction agent, for example manganese acetate, or foreign metals, the advantage of a higher capacitance, which approaches the capacitance measured "wet," may be combined with the advantages of the low residual currents, little variation, and of improved break-down stability. Consequently, it is further proposed to produce at least the first manganese dioxide layer with normal conductivity and only thereafter apply manganese dioxide layers with lowered conductivity. For the production of the first manganese dioxide layer, a dilute aqueous solution of manganese nitrate is expediently used in order to obtain a well-adhering, dense manganese dioxide layer, said solution preferably being a solution with a density 1.3 g./cm.³ which corresponds to a solution of approximately 30 Gew percent (by weight) water-free manganese nitrate. The subsequent manganese dioxide layers may be produced from higher concentrated solutions. However, if one dispenses with complete utilization of the capacitance which can be measured wet, that is to say, if the first manganese dioxide layer is produced with reduced conductivity, especially break-down stable capacitors are obtained which may be used in special cases, for example for higher voltages.

Up to now, it has not been possible to produce dry-capacitors for higher voltages because it was not possible to appropriately set high intermediate forming voltages. The intermediate forming voltage always had to be kept relatively low in order to limit the rejection rate. Even if the subsequent manganese dioxide layers were deposited with lowered conductivity, the intermediate forming voltage could not be sufficiently increased that capacitors for voltages higher than 75 v. could likewise be produced. However, if a foreign metal oxide is built into the first manganese dioxide layer, which foreign metal oxide effects a decrease of the conductivity of the manganese dioxide, in particular zinc oxide, preferably only into the first manganese dioxide layer, the intermediate forming voltage may be considerably increased.

In this regard, the following considerations may be taken as a basis: As is well known, the damages suffered by the dielectric during the pyrolysis of the manganese nitrate occur, above all, during the production of the first manganese dioxide layer because during this process the oxide layer is lying exposed and unprotected. When the subsequent manganese dioxide layers are applied, the previously applied manganese dioxide layer already provides a degree of protection to the dielectric. The attainable intermediate forming voltage may be looked upon as a criterion for the degree of damage of the dielectric, regardless whether existing damage in the oxide layer is removed during the intermediate forming or whether the oxide layer has remained undamaged during the pyrolysis.

A simple, obvious possibility for the avoiding of damage to the oxide layer during the pyrolysis of the manganese nitrate would actually consist of effecting the pyrolysis at relatively low oven temperatures. Normally a temperature between 280 and 300° C. is maintained in the oven for the pyrolysis of the manganese nitrate. However, a temperature decrease below approximately 280° C. causes longer pyrolysis duration and again leads to poorer values in the capacitors. However, if the first manganese dioxide layer is, for example, deposited with a zinc oxide content, the high oven temperatures can be maintained without damage to the dielectric during the pyrolysis, so that in addition to the advantages already described, high intermediate forming voltages are possible.

Consequently, if aluminum dry-capacitors, niobium dry-capacitors or in particular tantalum dry-capacitors for voltages over 75 v. are to be produced, it is expedient to produce the first manganese dioxide layer with decreased conductivity. In this case, it is especially advantageous if a foreign metal oxide is built *only* into the first manganese dioxide layer and the further layers are applied with normal conductivity. For the first manganese dioxide layer of low conductivity, a mixture of such foreign metal may be added to the solution of manganese nitrate in water, said mixture to decompose to the oxide, at the latest, at the oven temperature set for the pyrolysis of the manganese nitrate. As has become evident, it is, in this case, especially advantageous if zinc oxide is preferably only built into the first manganese dioxide layer and if, for this purpose, zinc nitrate is added to the solution of manganese nitrate in water. In this case, the entire concentration of this solution is expediently adjusted to a maximum of approximately 20 Gew percent. As a result, a good moistening of the anode bodies with the solution is assured.

It can be assumed that the zinc nitrate addition has such an advantageous effect on the high intermediate forming voltage to be employed for the reason that between the decomposition of the manganese nitrate and of the zinc nitrate a wide span of approximately 90° C. exists, which results in a very considerable influence not only of the first, but of the entire pyrolysis process upon the dielectric. The decomposition temperature of the manganese nitrate lies at 150° C., that of the zinc nitrate at 240° C.

This more milder influence of the entire pyrolysis process can be visualized as the first pyrolysis of the manganese nitrate taking place in a melt of zinc nitrate. The zinc nitrate is only thermically decomposed when all or at least the largest portion of the manganese nitrate is decomposed. This process may be repeated during the subsequent pyrolysis processes since the zinc oxide located in the first layer may be reconverted into zinc nitrate by reaction with the nitrous gases occurring during the pyrolysis of the pure manganese nitrate. Because of this, zinc oxide also is present in the subsequent manganese dioxide layers which are produced through pyrolysis of pure manganese nitrate. In this case, the formation of the semi-conducting oxide layer is consequently practically accomplished in two stages, and a conductivity gradient is formed over the entire manganese dioxide layers in such a manner that the layer adjacent to the dielectric possesses the lowest conductivity and the manganese dioxide layer last applied possesses the highest conductivity. Because of this the effect of the manganese dioxide layer of reduced electric conductivity becomes especially effective as an "electron brake."

It is, indeed, possible, in the production of capacitors of high operating voltage, that not only the first manganese dioxide layer, but also the following manganese dioxide layers be applied with lowered conductivity, that is to say, preferably from a manganese nitrate solution mixed with zinc nitrate. However, the advantages of the improved residual current behavior and of the increased intermediate forming voltage may already be achieved when such a manganese nitrate solution is utilized for the produciton of only the first manganese dioxide layer.

Additions of nickel nitrate and of cobalt nitrate to manganese nitrate solutions likewise show this advantageous effect, but, however, not in the same proportion as zinc nitrate. As has become evident during the examinations upon which the invention is based, this principally dependent upon the fact that the decomposition temperature of the nickel nitrate and of the cobalt nitrate lie closely adjacent to the decomposition temperature of the manganese nitrate, that is to say, at $195 \pm 10°$ C. for nickel nitrate and at $210 \pm 10°$ C. for cobalt nitrate which does not have the same milder pyrolysis influence effect as the addition of zinc nitrate. Still another reason appears for the especially advantageous use of zinc oxide as addition. Nickel and cobalt partially change their valence during the pyrolysis, $Ni^{2-}$ turning to $Ni^{3+}$ and $Co^{2+}$ turning to $Co^{3+}$. The mixed oxides occurring during this process, for example $NiO/Ni_2O_3$ or more specifically $NiO_{1-x}$, like manganese dioxide, possess semi-conductor qualities. In contrast to this, zinc retains its valence during the pyrolysis.

The best results with regard to good adherance stability of the manganese dioxide layers as well as with regard to a high intermediate forming voltage are obtained if the total concentration of the nitrates in the aqueous solution is so adjusted that it is very small for he production of the first manganese dioxide layer of low conductivity, for example between 18–20 Gew percent. When using a zinc nitrate as an addition to the manganese nitrate solution, a content of 5–6 Gew percent zinc nitrate in the manganese nitrate solution was found to be optimum. Higher zinc nitrate content causes an increase of the loss factor of the capacitors while a smaller content exercises practically no influence with respect to the attainable intermediate forming voltage. The preferred manganese nitrate solution containing zinc nitrate contains 5 to 6, preferably 5.7 Gew percent zinc nitrate $Zn(NO_3)_2$, 12 to 15, preferably 13.0 Gew percent manganese nitrate $Mn(NO_3)_2$, with the remainder water.

An even better moistening of the anode bodies may be achieved if the dilute nitrate solutions utilized for the application of the first manganese dioxide layer are heated, preferably by a water-bath up to approximately $80 \pm 5°$ C.

It is also especially advantageous, in particular for the intermediate forming voltage, as already mentioned, if a dilute manganese nitrate solution, mixed with additional substances, in particular mixed with zinc nitrate, is employed only for the application of the first manganese dioxide layer and if the further layers are produced with normal conductivity. For example, for the production of the further layers more concentrated manganese nitrate solutions may be used in order to keep the number of the required impregnations as small as possible. 30–50 Gew percent, aqueous solutions of manganese nitrate are advantageous for the production of the subsequent manganese dioxide layers. The last layers may be produced from even higher concentrated solutions or out of melts of manganese nitrate, for example, out of a melt of $Mn(NO_3)_2 \cdot 4H_2O$ which corresponds to a 71.3 Gew percent manganese nitrate solution. As a result, the mechanical stability of the manganese oxide layer is increased. However, for capacitors for 75 v. operating voltage, empirical manganese nitrate solutions with only approximately 30 Gew percent of water-free manganese nitrate are to be preferred.

For an especially even covering of the anode bodies, with layers, it is advantageous if the respective anode bodies impregnated with the manganese nitrate solution, during the pyrolysis of the manganese nitrate, are rotated on their axis or around an axis parallel to their axis, as is already known.

Furthermore it is especially advantageous for the process according to the invention if the anode bodies provided with the oxide layer are, before the application of the manganese dioxide layers, exposed to the mentioned preliminary treatment which is termed a "thermic stabilization" because through this preliminary treatment damage of the dielectric during the pyrolysis of the manganese nitrate resulting from oxygen removal is, from the beginning, restricted, and the loss factors of the capacitors are considerably reduced.

Consequently, if capacitors of low voltage are to be produced, it is generally expedient that the anode bodies are successively impregnated (inserting the respective intermediate treatments, such as transformation of the manganese nitrate to manganese dioxide, tempering, intermediate forming), initially once or twice with dilute, addition-free manganese nitrate solutions, then one to four times with manganese nitrate solutions containing additional substances, and finally once or twice with an addition-free manganese nitrate hydrate melt. In this case, it may be expedient to undertake one or two impregnations with addition-free manganese nitrate solutions between several impregnations with manganese nitrate solutions containing additional substances. For example, for dry-capacitors for 15 v. operating voltage, the following impregnation succession is suitable:

(a) twice with a dilute manganese nitrate solution,
(b) once with a manganese nitrate solution provided with additions,
(c) twice with a manganese nitrate melt, i.e., a concentrated manganese nitrate solution.

In this case, a tempering and intermediate forming of the anodes may be inserted after (a), (b) and (c).

For dry-capacitors for 35 v. operating voltage:

(a) twice with a dilute manganese nitrate solution,
(b) twice with a manganese nitrate solution provided with additions,
(c) once with a manganese nitrate solution provided with additions,
(d) once with a manganese nitrate melt, during which process expediently tempering and intermediate forming are respectively inserted after (a), (b), (c) and (d).

If the production involved is the production of capacitors for a higher operating voltage, for example 100 v., then only the first manganese dioxide layer is expediently produced from dilute solutions with zinc oxide content. For the following manganese dioxide layers which are supposed to have normal conducting ability, expediently concentrated solutions are used.

In the following, two preferred examples are described in more detail in order to explain the invention.

Example 1 relates to a tantalum dry-capacitor for 75 v. operating voltage. The anodes were sinter-bodies with 4.5 mm. diameter and 11 mm. length, preformed and thermically stabilized, and were produced in the following fabrication steps according to the invention:

(1) First impregnation of the anode bodies effected in dilute manganese nitrate solution (30 Gew percent manganese nitrate) at 25° C., transforming the manganese nitrate dioxide through heating to 280° C. for three minutes, with intermediate forming in dilute acetic acid (4 mmol/l.) at 90° C. up to a final voltage of 100 v., (2) Second impregnation effected in a manganese nitrate hydrate melt which contained an addition of 20 mol percent manganese acetate, at 40° C., transforming the manganese nitrate into manganese dioxide through heating to 280° C. for three minutes, tempering in a circulating air oven at 250° C. for 15 minutes, with intermediate forming in dilute acetic acid (4 mmol/l.) at 90° C. up to a final voltage of 90 v., (3) Third impregnation effected in a manganese nitrate hydrate melt which contained an addition of 7 mol percent manganese acetate, at 40° C., transforming the manganese nitrate into manganese dioxide by heating to 20° C. for three minutes, tempering in a circulation air oven at 250° C. for 15 minutes, with intermediate forming in dilute acetic acid (4 mmol/1.) at 90° up to a final voltage of 85 v., (4) Fourth impregnation effected in a manganese nitrate hydrate melt which contained an addition of 20 mol percent manganese dioxide through heating to 280° C. for three minutes, tempering in a circulating air oven at 250° C. for 15 minutes, with intermediate forming in dilute acetic acid (4 mmol/l.) at 90° C. up to a final voltage of 85 v.

(5) Fifth impregnation effected in a dilute manganese nitrate solution (30 Gew percent manganese nitrate) at 25° C., transforming of the manganese nitrate into manganese dioxide through heating to 280° C. for three minutes, tempering in a circulating air oven at 250° C. for 15 minutes, with intermediate forming in dilute acetic acid (4 mmol/l.) at 90° C. up to a final voltage of 85 v.

The anodes, covered with layers of manganese dioxide in such a manner, were further, as customary, graphited by dipping in a graphite suspension. The residual currents were then measured 30 seconds after application of the operating voltage. Following contacting with conductive silver, installation in a case with soldering (soldering temperature below 250° C.), measurements of the capacitance, of the loss factor and of the apparent resistance were undertaken. The measured values specified in the following are average values of five capacitors Residual currents: 0.05 to 0.1 μa.
Capacitance: 3 μf.
Loss factor (50 Hz.): 0.6%
Apparent resistance (10 kHz.): 6.6 ohms.

In Example 2, tantalum dry-capacitors of 100v. nominal voltage were produced. The anodes were sinter-bodies of 3 mm. diameter and 7 mm. length. They were preformed, i.e., covered with the oxide layer operating as dielectric, and thermically stabilized. According to the invention, they were produced by the following fabrication steps:

(1) First impregnation of the anode bodies effected at approximately 80° C. in a solution which contained approximately 5.7 Gew percent $Zn(NO_3)_2$, 13 Gew percent $Mn(NO_3)_2$, and the remainder water and pyrolysis of the nitrate mixture into manganese dioxide and zinc oxide by heating to 280° C. in an oven for four minutes while rotating the anode bodies;

(2) Second impregnation of the anode bodies effected in an $Mn(NO_3)_2$-solution of approximately 36.5 Gew percent at 25° C., pyrolysis of the manganese nitrate into manganese dioxide through heating at 280° C. for four minutes while rotating the anode bodies, with intermediate forming in 0.01 N ammonia at 25° C. up to a final voltage of 200 v.;

(3) Third impregnation of the anode bodies effected in an $Mn(NO_3)_2$-solution of 71.3 Gew percent at approximately 80° C., and pyrolysis of the manganese nitrate into manganese dioxide through heating to 280° C. for four minutes while rotating the anode bodies;

(4) Repetition of the treatment according to (3), with intermediate forming an 0.01 N ammonia at 25° C. up to a final voltage of 160 v.

The anode bodies covered with layers of manganese dioxide in such a manner are further, as customary, graphited by dipping in a graphite suspension, contacted with conductive silver, installed into a case and, for aging, placed upon an electric voltage of 75 v. for 60 hours at 125° C. The finished capacitors possessed the measured values specified in the following, which values are average values at 15 capacitors:

Residual currents: 25 na.
Capacitance: 2.26 μf.
Loss factor (50 Hz.): 0.39%
Apparent resistance (10 kHz.): 6.6 ohms.

Changes and modifications are possible and may be made within the scope and spirit of the appended claims which define what is believed to be new and desired to have protected by Letters Patent.

We claim:

1. In the method of producing a capacitor wherein a dielectric oxide layer is formed on a body from the group consisting of aluminum, tantalum and niobium by anodizing and a manganese oxide counter-electrode layer is formed on the first mentioned oxide layer, the improvement comprising depositing said manganese oxide layer from a mixture of solutions of manganous nitrate and manganous acetate at a temperature between 250° and 300° C., the amount of manganous acetate in the mixture being sufficient to produce a manganese oxide layer containing less oxygen than is present in $MnO_2$.

2. A method of producing a capacitor in accordance with claim 1 in which the mixture of solutions contains from 2 to 20 mole percent manganous acetate.

3. A method of producing a capacitor in accordance with claim 1 in which the mixture of solutions contains 2 to 3 mole percent of manganous acetate.

4. A method of producing a capacitor in accordance with claim 1 in which the mixture of solutions contains 3 to 10 mole percent of manganous acetate.

References Cited

UNITED STATES PATENTS

| | | | |
|---|---|---|---|
| 2,276,864 | 3/1942 | Pearson | 201—63 |
| 3,308,350 | 3/1967 | Smyth et al. | 317—230 |
| 3,029,370 | 4/1962 | Hill | 317—230 |
| 3,054,029 | 9/1962 | Wagner et al. | 317—230 |
| 3,226,607 | 12/1965 | Lauchner | 317—230 |
| 3,277,553 | 10/1966 | Wesolowski | 29—25.31 |
| 3,279,030 | 10/1966 | Wagner et al. | 29—25.31 |
| 3,314,124 | 4/1967 | Okamoto et al. | 29—25.31 |
| 3,375,413 | 3/1968 | Brill | 317—230 |

FOREIGN PATENTS 1,188,725  11/1963  Germany.

JOHN H. MACK, Primary Examiner

W. B. VAN SISE, Assistant Examiner

U.S. Cl. X.R.

29—570; 117—200; 204—56, 37; 317—230